United States Patent
Uesumi et al.

(10) Patent No.: US 10,136,667 B2
(45) Date of Patent: Nov. 27, 2018

(54) THICKENING COMPOSITION AND METHOD FOR PRODUCING SAME

(71) Applicant: MATSUTANI CHEMICAL INDUSTRY CO., LTD., Itami-shi, Hyogo (JP)

(72) Inventors: Akifumi Uesumi, Nagaokakyo (JP); Kensaku Shimada, Minoh (JP); Yasuo Katta, Akashi (JP); Tomonori Morimoto, Higashiosaka (JP); Masaki Gouro, Kobe (JP)

(73) Assignee: MATSUTANI CHEMICAL INDUSTRY CO., LTD., Itami-Shi, Hyogo (JP)

( * ) Notice: Subject to any disclaimer, the term of this patent is extended or adjusted under 35 U.S.C. 154(b) by 0 days.

(21) Appl. No.: 15/032,102

(22) PCT Filed: Oct. 30, 2014

(86) PCT No.: PCT/JP2014/078941
§ 371 (c)(1),
(2) Date: Apr. 26, 2016

(87) PCT Pub. No.: WO2015/064707
PCT Pub. Date: May 7, 2015

(65) Prior Publication Data
US 2016/0278407 A1  Sep. 29, 2016

(30) Foreign Application Priority Data

Nov. 1, 2013 (JP) .................................. 2013-228607

(51) Int. Cl.
| | |
|---|---|
| A23L 2/52 | (2006.01) |
| A23L 29/20 | (2016.01) |
| A23L 29/00 | (2016.01) |
| A23L 29/238 | (2016.01) |
| A23L 29/25 | (2016.01) |
| A23L 29/256 | (2016.01) |
| A23L 29/269 | (2016.01) |
| A23L 1/03 | (2006.01) |
| A23L 1/0526 | (2006.01) |
| A23L 1/053 | (2006.01) |
| A23L 1/0532 | (2006.01) |
| A23L 1/054 | (2006.01) |

(52) U.S. Cl.
CPC ............. *A23L 29/20* (2016.08); *A23L 1/0315* (2013.01); *A23L 1/053* (2013.01); *A23L 1/0526* (2013.01); *A23L 1/0532* (2013.01); *A23L 1/0541* (2013.01); *A23L 2/52* (2013.01); *A23L 29/015* (2016.08); *A23L 29/035* (2016.08); *A23L 29/238* (2016.08); *A23L 29/25* (2016.08); *A23L 29/256* (2016.08); *A23L 29/27* (2016.08); *A23V 2002/00* (2013.01)

(58) Field of Classification Search
CPC ... A23V 2002/00; A23L 29/256; A23L 29/39; A23L 29/20; A23L 29/238; A23L 29/25; A23L 33/16; A23L 29/269; A23L 33/00; A23L 1/0541; A23L 1/0532; A23L 1/0526; A23F 3/16
See application file for complete search history.

(56) References Cited

U.S. PATENT DOCUMENTS

| | | | |
|---|---|---|---|
| 2005/0244543 A1* | 11/2005 | Takaichi | A23L 33/17 426/74 |
| 2007/0128285 A1 | 6/2007 | Jin et al. | |
| 2008/0280022 A1 | 11/2008 | Seko et al. | |
| 2010/0255146 A1* | 10/2010 | Seko | A23L 2/52 426/2 |
| 2011/0177176 A1* | 7/2011 | Sridhar | A23L 29/231 424/728 |

FOREIGN PATENT DOCUMENTS

| | | |
|---|---|---|
| EP | 1 046 347 A1 | 10/2000 |
| JP | H10-204408 A | 8/1998 |
| JP | 2006-6252 A | 1/2006 |
| JP | 3930897 B1 | 6/2007 |
| JP | 2009-55 A | 1/2009 |

(Continued)

OTHER PUBLICATIONS

International Search Report dated Feb. 3, 2015 issued in corresponding International Application No. PCT/JP2014/078941.

(Continued)

*Primary Examiner* — Hong T Yoo

(74) *Attorney, Agent, or Firm* — Nath, Goldberg & Mayer; Joshua B. Goldberg; Tanya E. Harkins

(57) ABSTRACT

A thickening composition which contains specific amounts of a metal salt-enclosing dextrin and a thickening polysaccharide and which has a good dispersibility raises the viscosity rapidly, and has an excellent thickening effect can be produced by the steps of obtaining the metal salt-enclosing dextrin by mixing, dissolving, and homogenizing a dextrin and a metal salt in water, followed by drying, and adding the metal salt-enclosing dextrin to the thickening polysaccharide followed by mixing or granulation. The thickening composition makes it possible to provide a thickening composition which has a good dispersibility, raises the viscosity rapidly, and offers an improved thickening effect per unit mass in a wide variety of water-containing foods such as water, teas, refreshing beverages, dairy beverages, soups, and thick liquid foods.

3 Claims, No Drawings

(56) References Cited

FOREIGN PATENT DOCUMENTS

| JP | 2009-60794 | A | 3/2009 |
|---|---|---|---|
| JP | 4472699 | B2 | 6/2010 |
| JP | 4589251 | B2 | 12/2010 |
| JP | 4781208 | B2 | 9/2011 |
| JP | 4800425 | B2 | 10/2011 |
| JP | 2013-111035 | A | 6/2013 |
| KR | 1020050071503 | A | 7/2005 |
| KR | 1020090048626 | A | 5/2009 |
| WO | 2006/095756 | A1 | 9/2006 |
| WO | 2009/036294 | A1 | 3/2009 |

OTHER PUBLICATIONS

Doki, et al., "Granulating Conditions for Preparation of Thickening Agents and Homogeneity of Granules", J. Soc. Powder Technol., vol. 46, No. 5, pp. 371-375, 2009.
Office Action dated Apr. 18, 2017 issued in corresponding Korean Application No. 10-2016-7010785.
Cho, et al., "Steady and Dynamic Rheological Properties of Thickened Beverages Used for Dysphagia Diets", Food Sci. Biotechnol., vol. 21, No. 6, pp. 1775-1779, 2012.
Extended European Search Report dated May 15, 2017 issued in corresponding European Application No. 14857278.7.

\* cited by examiner

THICKENING COMPOSITION AND METHOD FOR PRODUCING SAME

This National Phase Application filed under 35 U.S.C. 371 as a national stage of PCT/JP2014/078941, filed Oct. 30, 2014, an application claiming the benefit of Japanese Application No. 2013-228607, filed Nov. 1, 2013, the content of each of which is hereby incorporated by reference in its entirety.

TECHNICAL FIELD

The present invention relates to a thickening composition excellent in solubility, and a method for producing the thickening composition. In particular, the present invention relates to a thickening composition which has a high thickening activity per unit mass and is excellent in solubility, to and a method for producing the thickening composition.

BACKGROUND ART

As the population is getting older nowadays, the number of people with mastication and swallowing disorders who have impaired chewing and swallowing abilities is increasing. When accidental aspiration of a water-containing food occurs in a person with mastication and swallowing disorders, the food enters the bronchi and may cause a severe disease such as pneumonia. Therefore, it is necessary to pay special attention to ingestion of low-viscosity foods such as tea, milk, juice, and soup.

For the people with mastication and swallowing disorders, many products of thickening compositions for increasing the viscosity of liquid foods, which are so called thickening agents or swallowing aids, have been developed and put on the market. Especially, thickening compositions have been recently required to not only be resistant to the formation of unmixed lumps ("DAMA" in Japanese) or large unmixed lumps ("MAMAKO" in Japanese) when dissolved in water-containing foods, but also have characteristics such as rapid dispersing and expression of viscosity, good flavor and taste, high transparency, and low production costs.

Patent Literatures 1, 2, and 3 disclose a thickening composition having an improved viscosity expression property and a method in which an aqueous metal salt solution is sprayed onto the surface of a xanthan gum powder followed by granulation. Meanwhile, Patent Literature 4 discloses a method in which fluidized-bed granulation of xanthan gum or the like is conducted by using an aqueous solution containing calcium pantothenate as a binder. Further, Patent Literature 5 describes the use of an aqueous solution containing ascorbic acid or its related compound as a binder. In these methods, presumably, the surface of xanthan gum or the like is coated with the metal salt or the ascorbic acid or its related compound, so that the wettability of the surface with water is improved, and the water-dispersibility is improved. However, in each of these methods, it is necessary to directly spray-coat the surface of xanthan gum or the like by using an aqueous solution of the metal salt, ascorbic acid, or the like. Hence, these methods have such problems that the addition of a predetermined amount of the metal salt or the like by spraying to obtain the effect is not simple, and that it may be difficult to control the particle size depending on the type and amount of the metal salt or the like dissolved in the spraying liquid and on factors such as the amount of the liquid sprayed. In addition, since the metal salt or the ascorbic acid or its related compound is directly attached as a coating to the surface of xanthan gum or the like, there is a concern about an influence on the quality of tastes, such as the saltiness, the bitterness, and the sourness, when certain types of metal salts or the ascorbic acid or its related compound are used.

In addition, Non Patent Literature 1 describes two-step granulation for obtaining a uniform thickening agent. In this two-step granulation, granules of a thickening polysaccharide alone are produced in primary granulation, and then granules as a finished product are produced in secondary granulation by again granulating the granules obtained in the primary granulation together with a dispersant such as dextrin. In principle, granulation is a process which requires high costs and long time. Hence, the granulation conducted two times in separate two steps presents a big problem in terms of costs, even though a good product can be obtained.

Patent Literature 6 discloses a thickening composition having an improved dispersibility, which comprises a metal salt-containing starch degradation product and a thickening polysaccharide. Patent Literature 6 also discloses that, in the thickening composition, the content of the metal salt is preferably 0.5 to 40 parts by mass relative to 100 parts by mass of the starch degradation product, and the mass ratio of the starch degradation product containing the metal salt to the thickening polysaccharide is preferably from 55:45 to 99:1.

However, the ratio of the starch degradation product to the thickening polysaccharide is relatively high in this composition, and the amount of the thickener required to be added to a target food to obtain the thickening effect is two times or more the amount in the case where the thickening polysaccharide is used alone. Accordingly, the possibility that this composition may affect the physical properties, the texture, or the taste of the food is undeniable.

CITATION LIST

Patent Literatures

Patent Literature 1: Japanese Patent No. 3930897
Patent Literature 2: Japanese Patent No. 4472699
Patent Literature 3: Japanese Patent No. 4800425
Patent Literature 4: Japanese Patent No. 4781208
Patent Literature 5: Japanese Patent No. 4589251
Patent Literature 6: Japanese Patent Laid-open Publication No. 2013-111035

Non Patent Literature

Non Patent Literature 1: Journal of the Society of Powder Technology Japan, 46(5), 2009, 371-375

SUMMARY OF INVENTION

Technical Problems

An object of the present invention is to provide a thickening composition which has a good dispersibility, raises the viscosity rapidly and offers an improved thickening effect per unit mass in a wide variety of water-containing foods such as water, teas, refreshing beverages, dairy beverages, soups, and thick liquid foods (hereinafter, the thickening composition is also referred to simply as a composition), and a method for producing the composition.

Solution to Problems

The present inventors have conducted intensive study to achieve the above-described object, and consequently found that a thickening composition which comprises a metal salt, a dextrin, and a thickening polysaccharide at a specific mass ratio and which is produced through the steps of obtaining a metal salt-enclosing dextrin by mixing, dissolving, and homogenizing the dextrin and the metal salt in water, followed by drying, and mixing or granulating the metal salt-enclosing dextrin with the thickening polysaccharide is rapidly dispersed without formation of unmixed lumps, raises the viscosity rapidly, and offers a high thickening effect per unit mass. This finding has led to the completion of the present invention.

Specifically, the present invention provides the following inventions.
1) A thickening composition, comprising:
   a thickening polysaccharide; and a metal salt-enclosing dextrin, wherein
   the mass ratio of the thickening polysaccharide to the metal salt-enclosing dextrin is from 46:54 to 70:30, and
   the ratio in parts by mass of the metal salt is 3.5 to 12.8 parts by mass relative to 100 parts by mass of the thickening polysaccharide.
2) The thickening composition according to the above-described invention 1, wherein the dextrin has a DE of 8 to 25.
3) The thickening composition according to the above-described inventions 1 or 2, wherein the metal salt is at least one selected from the group consisting of calcium lactate, calcium acetate, calcium gluconate, calcium pantothenate, calcium ascorbate, magnesium sulfate, trisodium citrate, and tripotassium citrate.
4) The thickening composition according to any one of the above-described inventions 1 to 3, wherein the thickening polysaccharide comprises at least one first thickening polysaccharide selected from the group consisting of xanthan gum and carrageenan.
5) The thickening composition according to the above-described invention 4, wherein the thickening polysaccharide further comprises at least one second thickening polysaccharide selected from the group consisting of guar gum, locust bean gum, taxa gum, and glucomannan.
6) A food comprising the thickening composition according to any one of the above-described inventions 1 to 5.
7) A method for producing the thickening composition according to any one of the above-described inventions 1 to 5, the method comprising the steps of:
   obtaining a metal salt-enclosing dextrin by mixing, dissolving, and homogenizing a dextrin and a metal salt in water, followed by drying; and
   adding the metal salt-enclosing dextrin to a thickening polysaccharide, followed by mixing or granulation.

Advantageous Effects of Invention

The present invention makes it possible to provide a thickening composition which has a good dispersibility, raises the viscosity rapidly and offers an excellent thickening effect in a wide variety of water-containing foods such as water, teas, refreshing beverages, dairy beverages, soups, and thick liquid foods, and a method for producing the thickening composition. Since the thickening composition of the present invention has a high thickening effect per unit mass, the viscosity of a food can be raised by using a small amount of the thickening composition. Accordingly adverse effects on the physical properties and the flavor of the food can be minimized, and a thickened food can be produced at low costs.

DESCRIPTION OF EMBODIMENTS

The dextrin in the present invention refers to a starch hydrolysate obtained by hydrolysis of starch with an acid or an enzyme. The term dextrin also includes indigestible dextrins which are obtained by heating starch to which a trace amount of an acid is added, followed by hydrolysis with an enzyme.

The DE in the present invention is an acronym of Dextrose Equivalent (glucose equivalent), which is an index widely used to express the degree of hydrolysis of a starch hydrolysate, and indicates the ratio of reducing sugars among solid components. In the present invention, the DE is a value determined by the Willstatter Schudel method.

The dextrin in the present invention preferably has a DE of 8 to 25. More preferably, the DE is 10 to 25, and further preferably 17 to 20.

The metal salt in the present invention is not particularly limited, as long as the metal salt is generally used for foods. From the viewpoints of excellent quality of taste and the like, the metal salt is preferably a metal salt of an organic acid or an inorganic acid, and is further preferably one or more selected from calcium lactate, calcium acetate, calcium gluconate, calcium pantothenate, calcium ascorbate, magnesium sulfate, trisodium citrate, and tripotassium citrate. More preferably, the metal salt is magnesium sulfate or calcium pantothenate.

The thickening polysaccharide used in the present invention is not particularly limited. From the viewpoints of excellent dispersibility of a composition, excellent rise in viscosity after dissolution, and the like, the thickening polysaccharide comprises, for example, one or more first thickening polysaccharides selected from xanthan gum and carrageenan.

In addition, a second thickening polysaccharide usable in combination with these first thickening polysaccharides comprises, for example, at least one selected from guar gum, locust bean gum, taxa gum, and glucomannan.

It is preferable to partially replace xanthan gum and/or carrageenan with at least one of these second thickening polysaccharides and use them in combination, because the sol/gel characteristics of a composition can be modified without affecting the dispersibility of the composition.

The first thickening polysaccharide and the second thickening polysaccharide can be mixed at any ratio. From the viewpoint of modifying the sol/gel characteristics of the composition, the first thickening polysaccharide and the second thickening polysaccharide are contained, for example, at a mass ratio preferably in a range of about 10:1 to 1:10, and further preferably in a range of about 5:1 to 1:1.

In the present invention, the metal salt enclosed in the dextrin is prepared, for example, as follows. First, a dextrin and a metal salt are dissolved, mixed, and homogenized in water. Then, the concentration is adjusted to 20 to 60% by mass, and preferably 30 to 55% by mass. Here, the dextrin may be prepared by hydrolysis of starch in a usual manner, or a commercially available dextrin can be used. Considering that the dextrin is dried in a later step, it is preferable to use a liquid dextrin. The metal salt may be added directly to an aqueous dextrin solution, or a solution of the metal salt separately prepared at a high concentration may be added to an aqueous dextrin solution. After that, this mixture is dried by spray drying or the like to obtain a metal salt-enclosing dextrin.

In the present invention, the expression that a metal salt is "enclosed" in a dextrin means that the metal salt is present in the dextrin in a homogenized state, and refers to an amorphous state where no free metal salt crystals are present.

It has been found that the dispersibility of the thickening composition and the rise in viscosity are influenced by the mass ratio of the thickening polysaccharide to the metal salt.

The mass of the metal salt enclosed in the dextrin is not particularly limited, as long as the metal salt can be enclosed in the dextrin. In general, the metal salt is blended in an amount (in mass) less than that of the dextrin. If the amount is equal to or more than that of the dextrin, it is not possible to enclose all of the metal salt in the dextrin.

The ratio of the metal salt to the thickening polysaccharide is 3.5 to 12.8 parts by mass and more preferably 5.2 to 7.6 parts by mass relative to 100 parts by mass of the thickening polysaccharide. If the ratio is out of the range of 3.5 to 12.8 parts by mass, the dispersibility of the thickening composition or the rise in viscosity deteriorates.

In addition, the mass ratio of the thickening polysaccharide to the metal salt-enclosing dextrin (also referred to as the enclosure material) is from 46:54 to 70:30, and preferably from 50:50 to 60:40. If the mass ratio exceeds 70:30 (in other words, if the ratio of the thickening polysaccharide increases), a larger amount (higher ratio) of the metal salt in the enclosure material is required to keep the dispersibility and the rise in viscosity. As a result, the hygroscopicity of the enclosure material increases, so that the storage stability and the recovery in the spray drying or the like are greatly lowered. On the other hand, if the ratio is less than 46:54 (in other words, if the ratio of the thickening polysaccharide decreases), the viscosity per mass of the composition decreases, which is disadvantageous in terms of cost, and also the amount of the composition used per food increases, so that an adverse effect on the texture is unavoidable, although no problem associated with the dispersibility or the rise in viscosity arises.

The metal salt-enclosing dextrin (enclosure material) can be prepared by drying a solution of a mixture of the dextrin and the metal salt. The drying can be conducted by a method such as spray drying, drum drying, vacuum drying, or freeze drying. Considering the efficiency the cost, and the like, spray drying is preferable. Specifically the enclosure material can be prepared by preparing fine particles of the solution of the mixture of the dextrin with the metal salt by using an atomizer or a pressure nozzle, and then spraying the fine particles into a drying chamber in which the heated air temperature is adjusted to about 140 to 180° C., so that the outlet temperature can be about 80 to 100° C.

The thickening composition of the present invention can be prepared by mixing the thickening polysaccharide and the metal salt-enclosing dextrin (enclosure material) with each other at a mass ratio of 46:54 to 70:30, and preferably 50:50 to 60:40 and then homogenizing the mixture with a mixing apparatus such as a ribbon mixer or a nauta mixer. If necessary, it is also possible to further improve the dispersibility by granulating the enclosure material and the thickening polysaccharide by a method such as fluidized-bed granulation. Specific fluidized-bed apparatuses include fluidized-bed granulators such as batch-type fluidized-bed apparatuses, spouted fluidized-bed granulators, and spouted fluidized-bed granulators, and the like. In the granulation, the temperature of hot air (intake air) is adjusted to 30 to 120° C. and preferably 70 to 100° C. The temperature of the materials being granulated is adjusted to 25 to 100° C. and preferably about 30 to 100° C. At an excessively high temperature, it is difficult to granulate the materials. At an excessively low temperature, the materials do not flow readily. In addition, water or an aqueous solution of a saccharide, a dextrin, a starch, a gum, CMC, or the like can be used as a binder liquid. The spraying rate of the binder liquid varies depending on the type of the fluidized-bed apparatus, and the liquid amount is generally, but is not limited to, about 0.1 to 20 L/minute. The drying may be conducted simultaneously with the fluidization, or may be conducted in a subsequent step separately from the fluidization. When the drying is conducted simultaneously with the fluidization, the drying is preferably conducted at 50 to 80° C. In addition, the temperature for the drying after the spraying is preferably 70 to 100° C. After the granulation, it is also possible to make the particle size uniform by sieving.

The thus obtained thickening composition has a high thickening effect per unit mass, and a food can be made viscous by adding a small amount of the thickening composition. Hence, influences on the physical properties and texture of the food can be minimized, and the thickened food can be produced at low costs. In addition, when the thickening composition of the present invention is added to water, the metal salt enclosed in the dextrin inhibits the formation of the coating on the surfaces of the thickening polysaccharide and promotes penetration of water into the thickening polysaccharide. As a result, the formation of unmixed lumps is prevented, and the thickening composition is rapidly dispersed, and raises the viscosity. The amount of the thickening composition blended in a food may be set within a range from 1 to 10% by mass according to the desired viscosity.

EXAMPLES

Hereinafter, the present invention is described in further detail based on Examples; however, the present invention is not limited to these Examples.

Example 1

Influence of Mass Ratio of Metal Salt to Thickening Polysaccharide on Solubility of Thickening Composition To aqueous solutions each obtained by dissolving 100 g of a dextrin (TK-16 (DE18) manufactured by Matsutani Chemical Industry Co., Ltd.) in 300 g of ion-exchanged water, a metal salt (magnesium sulfate) was dissolved so as to achieve the concentrations shown in Table 3 in the resultant enclosure materials. Then, the solutions were spray dried with a spray dryer to prepare metal salt-enclosing dextrins (enclosure materials). Next, thickening compositions were prepared by powder blending of these enclosure materials with a thickening polysaccharide (xanthan gum (NOVAXAN (granulated) manufactured by Matsutani Chemical Industry Co., Ltd.)) at the mass ratios shown in Table 3. For each of the thickening compositions prepared at these ratios, the ratio (in parts by mass) of the metal salt relative to 100 parts by mass of the thickening polysaccharide was calculated (Table 3). In addition, the solubility of each of those thickening compositions was evaluated by the method shown in Table 1 using the evaluation criteria shown in Table 2. In the evaluation of the solubility, when the scores of both the dispersibility and the rise in viscosity were 3 or higher, the solubility was evaluated to be Good (G). When at least one of the scores was lower than 3, the solubility was evaluated to be Poor (P).

Based on the results, it was found that, in the range where the mass ratio of the thickening polysaccharide to the enclosure material was from 46:54 to 70:30, the solubility of the thickening composition was evaluated to be Good, when the test sample had a ratio in parts by mass of the metal salt of 3.5 to 12.8 parts by mass relative to 100 parts by mass of the thickening polysaccharide (Table 3).

TABLE 1

Solubility evaluation method

| | |
|---|---|
| Dispersibility | Prepare 100 g of ion-exchanged water in a 200 ml beaker at 20° C. Add a thickening composition in an amount equivalent to 1 g of the thickening polysaccharide to the beaker, and allow the mixture to stand for 3 seconds. Then, stir the mixture with a spatula for 1 minute. Visually observe the state after the stirring. |
| Rise in viscosity | Prepare 100 g of ion-exchanged water in a 200 ml beaker at 20° C. Add a thickening composition in an amount equivalent to 1 g of the thickening polysaccharide under stirring with a spatula. Stir the mixture for 30 seconds. Measure the viscosity one minute after the start of the dissolution with a BM-type viscometer (TOKIMEC). The viscosity was subjected to a 5-grade evaluation using the criteria shown in Table 2. |

TABLE 2

Evaluation criteria of solubility

| | Evaluated items | |
|---|---|---|
| Score | Dispersibility | Rise in viscosity |
| 5 | Extremely good dispersibility without any unmixed lumps or with a trace amount of unmixed lumps. | 1,100 cp or higher |
| 4 | Good dispersibility despite the presence of a small amount unmixed lumps. | 850 cp or higher and lower of than 1,100 cp |
| 3 | Acceptable dispersibility despite the presence of some unmixed lumps. | 600 cp or higher and lower than 850 cp |
| 2 | Poor dispersibility with the presence of many unmixed lumps. | 350 cp or higher and lower than 600 cp |
| 1 | Very poor dispersibility is with the formation of large unmixed lumps in some portions. | lower than 350 cp |

TABLE 3

Relationship between Mass Ratio of Enclosure Material to Thickening Polysaccharide and Solubility of Thickening Composition

| | Ratio of metal salt in enclosure material | Mass ratio of thickening polysaccharide to enclosure material | | Ratio in parts by mass of metal salt relative to 100 parts by mass | Solubility | | |
|---|---|---|---|---|---|---|---|
| Test sample | (% by mass) | Thickening polysaccharide | Enclosure material | of thickening polysaccharide | Dispersibility | Rise in viscosity | Evaluation |
| 1 | 0.2 | 46 | 54 | 0.2 | 1 | 2 | P |
| 2 | 3.0 | | | 3.5 | 5 | 5 | G |
| 3 | 10.9 | | | 12.8 | 5 | 4 | G |
| 4 | 11.5 | | | 13.5 | 5 | 2 | P |
| 5 | 0.0 | 50 | 50 | 0.0 | 1 | 2 | P |
| 6 | 0.1 | | | 0.1 | 1 | 2 | P |
| 7 | 0.5 | | | 0.5 | 1 | 2 | P |
| 8 | 3.5 | | | 3.5 | 4 | 5 | G |
| 9 | 5.2 | | | 5.2 | 5 | 5 | G |
| 10 | 7.6 | | | 7.6 | 5 | 5 | G |
| 11 | 11.4 | | | 11.4 | 5 | 4 | G |
| 12 | 12.8 | | | 12.8 | 5 | 4 | G |
| 13 | 18.0 | | | 18.0 | 5 | 1 | P |
| 14 | 1.5 | 60 | 40 | 1.0 | 1 | 1 | P |
| 15 | 7.1 | | | 4.8 | 5 | 4 | G |
| 16 | 7.6 | | | 5.1 | 5 | 4 | G |
| 17 | 22.5 | | | 15.0 | 5 | 1 | P |
| 18 | 2.3 | 70 | 30 | 1.0 | 1 | 1 | P |
| 19 | 8.2 | | | 3.5 | 4 | 5 | G |
| 20 | 11.4 | | | 4.9 | 4 | 5 | G |
| 21 | 29.9 | | | 12.8 | 4 | 3 | G |
| 22 | 33.1 | | | 14.2 | 5 | 1 | P |
| 23 | 10.6 | 78 | 22 | 3.0 | 1 | 1 | P |
| 24 | 45.5* | | | 12.8 | 3 | 3 | G |

*The metal salt was successfully enclosed in the dextrin, but the hygroscopicity of the enclosure material increased, so that the storage stability and the recovery in the spray drying were greatly lowered.

Example 2

Influence of DE of Dextrin on Solubility of Thickening Composition

Enclosure materials were prepared by the same method as in Example 1. Here, calcium lactate was used as the metal salt, dextrins having DEs shown in Table 4 (all the dextrins were manufactured by Matsutani Chemical Industry Co., Ltd.) were used as the dextrin, and the resultant ratio of the metal salt in each enclosure material was 5.2% by mass. Next, these enclosure materials were subjected to powder blending with xanthan gum, serving as a thickening polysaccharide, at a mass ratio of 50:50 to prepare thickening compositions in each of which the ratio in parts by mass of the metal salt was 5.2 parts by mass relative to 100 parts by mass of the thickening polysaccharide. The solubility of each of these thickening compositions was evaluated by the same method as in Example 1. Based on the results, it was found that the solubility of a thickening composition was evaluated to be Good, when the DE of the dextrin was 8 or higher (Table 4). However, when the DE exceeded 25, the yield of the enclosure material remarkably decreased in producing the enclosure material, and hence a DE exceeding 25 was impractical. In addition, a DE exceeding 18 is preferable, especially because the rise in viscosity is extremely good.

TABLE 4

Influence of DE of dextrin on solubility of thickening composition

| Test sample | DE of dextrin | Dispersibility | Rise in viscosity | Evaluation |
|---|---|---|---|---|
| 25 | 3 | 1 | 1 | Poor |
| 26 | 8 | 3 | 3 | Good |
| 27 | 11 | 5 | 4 | Good |
| 28 | 18 | 5 | 5 | Good |
| 29 | 25 | 5 | 5 | Good |
| 30 | 40 | 5 | 5 | Good |

Example 3

Influence of Type of Metal Salt on Solubility of Thickening Composition

Enclosure materials were prepared by the same method as in Example 1. Here, the metal salts shown in Table 5 were used as the metal salt, the dextrin TK-16 (DE18) (manufactured by Matsutani Chemical Industry Co., Ltd.) was used, and the resultant ratio of the metal salt in each enclosure material was 5.2% by mass. Next, these enclosure materials were subjected to powder blending with xanthan gum, serving as a thickening polysaccharide, at a mass ratio of 50:50 to prepare to prepare thickening compositions in each of which the ratio in parts by mass of the metal salt was 5.2 parts by mass relative to 100 parts by mass of the thickening polysaccharide. The solubility of each thickening composition was evaluated by the same method as in Example 1. Based on the results, when the metal salts of test samples 32 to 39 were used, the solubility was evaluated to be Good (Table 5).

TABLE 5

Influence of type of metal salt on solubility of thickening composition

| Test sample | Metal salt | Dispersibility | Rise in viscosity | Evaluation |
|---|---|---|---|---|
| 31 | None | 1 | 2 | Poor |
| 32 | Magnesium sulfate | 5 | 5 | Good |
| 33 | Calcium gluconate | 5 | 4 | Good |
| 34 | Calcium, pantothenate | 5 | 5 | Good |
| 35 | Calcium acetate | 5 | 4 | Good |
| 36 | Calcium lactate | 5 | 4 | Good |
| 37 | Calcium ascorbate | 5 | 4 | Good |
| 38 | Trisodium citrate | 5 | 4 | Good |
| 39 | Tripotassium citrate | 5 | 3 | Good |
| 40 | Calcium chloride | 5 | 1 | Poor |

Example 4

Influence of Type of Thickening Polysaccharide on Solubility of Thickening Composition

An enclosure material was prepared by the same method as in Example 1. Here, magnesium sulfate was used as the metal salt, the dextrin TK-16 (DE18) (manufactured by Matsutani Chemical Industry Co., Ltd.) was used, and the resultant ratio of the metal salt in each enclosure material was 5.2% by mass. Next, the thickening polysaccharide shown in Table 6 was subjected to powder blending with the enclosure material or TK-16(DE18) at a mass ratio of 50:50 to prepare thickening compositions in which the ratio in parts by mass of the metal salt was 5.2 parts by mass relative to 100 parts by mass of the thickening polysaccharide. The solubility of each thickening composition was evaluated by the same method as in Example 1. Based on the results, it was found that κ-carrageenan improved the solubility as in the case of xanthan gum.

TABLE 6

Influence of type of thickening polysaccharide on solubility of thickening composition

| Test sample | Type of thickening polysaccharide | Ratio in parts by mass of metal salt relative to 100 parts by mass of thickening polysaccharide | Solubility | | |
|---|---|---|---|---|---|
| | | | Dispersibility | Rise in viscosity | Evaluation |
| 41 | κ-Carrageenan | 5.21 | 5 | 5 | Good |
| 42 | | None | 1 | 3 | Poor |

Example 5

Influence of Combination of Thickening Polysaccharides on Dispersibility of Thickening Composition An enclosure material was prepared by the same method as in Example 1. Here, magnesium sulfate was used as the metal salt, the dextrin TK-16 (DE18) (manufactured by Matsutani Chemical Industry Co., Ltd.) was used, and the resultant ratio of the metal salt in each enclosure material was 5.2% by mass. The thickening polysaccharides used were the combinations of thickening polysaccharide 1 and thickening polysaccharide 2 shown in Table 7 at a mass ratio of 2:1. Next, the mixtures of the thickening polysaccharides were subjected to powder blending with the enclosure material at a mass ratio of 50:50 to prepare thickening compositions in each of which the ratio of the metal salt was 5.2 parts by mass relative to 100 parts by mass of the thickening polysaccharides. The solubility of each thickening composition was evaluated by the same method as in Example 1. Based on the results, by using the combinations of various thickening polysaccharides, thickening compositions having sol/gel characteristics different from those achieved in the cases where the thickening polysaccharides were used alone, without affecting the dispersibility of the thickening compositions. This indicates that thickening compositions which have various sol/gel characteristics according to the application and which are excellent in dispersibility can be obtained by changing the combination or ratio of thickening polysaccharides.

Example 6

Influence of Granulation on Dispersibility of Thickening Composition

Enclosure materials were prepared by the same method as in Example 1. Here, magnesium sulfate was used as the metal salt, the dextrin TK-16 (DE18) (manufactured by Matsutani Chemical Industry Co., Ltd.) was used, and the resultant ratios of the metal salt in the enclosure materials were as shown in Table 8. Next, each of these enclosure materials and xanthan gum (NOVAXAN (transparent type) 80 mesh manufactured by Matsutani Chemical Industry Co., Ltd.), serving as a thickening polysaccharide, were granulated by being introduced into a fluidized-bed granulator (flow coater (FLO-5) manufactured by Freund Corporation) at the corresponding mass ratio shown in Table 9. Note that all the ratios in parts by mass of the metal salt were adjusted to 12.8 parts by mass relative to 100 parts by mass of the thickening polysaccharide.

The solubility of each of the thus prepared granulated thickening compositions (granulated products) was evaluated by the same method as in Example 1, and compared with that of the corresponding powder mixture (non-granulated product). Based on the results, it was found that each granulated product had a more improved dispersibility than the non-granulated product.

TABLE 7

Influence of combination of thickening polysaccharides on dispersibility of thickening composition (the ratios of thickening polysaccharide 1 to thickening polysaccharide 2 were all 2:1)

| Test sample | Combination of thickening polysaccharides | | Dispersibility | Sol/gel characteristics |
| --- | --- | --- | --- | --- |
| | Thickening polysaccharide 1 | Thickening polysaccharide 2 | | |
| 43 | Xanthan gum | None | 5 | Formation of sol having pseudoplastic viscosity |
| 44 | | Guar gum | 5 | Formation of sol or gel having higher viscosity than that in the case of xanthan gum alone |
| 45 | | Locust bean gum | 5 | Formation of sol or gel having higher viscosity than that in the case of xanthan gum alone |
| 46 | | Glucomannan | 5 | Formation of sol or gel having higher viscosity than that in the case of xanthan gum alone |
| 47 | | Tara gum | 5 | Formation of weak gel or sol |
| 48 | κ-Carrageenan | None | 5 | Formation of sol or gel with low stringiness |
| 49 | | Guar gum | 5 | Formation of sol or gel having higher viscosity than that in the case of κ-carrageenan alone |
| 50 | | Locust bean gum | 5 | Formation of sol or gel having higher viscosity than that in the case of κ-carrageenan alone |
| 51 | | Glucomannan | 5 | Formation of sol or gel having higher viscosity than that in the case of κ-carrageenan alone |
| 52 | | Tara gum | 5 | Formation of weak gel or sol |

TABLE 8

Influence of granulation on dispersibility of thickening composition
(the ratios in parts by mass of the metal salt were all 12.8 parts by mass
relative to 100 parts by mass of the thickening polysaccharide)

| Test sample | Ratio of metal salt in enclosure material (% by mass) | Mass ratio of thickening polysaccharide to enclosure material | | Non-granulated/ granulated | Solubility | |
|---|---|---|---|---|---|---|
| | | Thickening polysaccharide | Enclosure material | | Dispersibility | Rise in viscosity |
| 53 | 8.5 | 40 | 60 | Non-granulated | 4 | 3 |
| 54 | | | | granulated | 5 | 5 |
| 55 | 12.8 | 50 | 50 | Non-granulated | 5 | 4 |
| 56 | | | | granulated | 5 | 5 |
| 57 | 29.9 | 70 | 30 | Non-granulated | 4 | 3 |
| 58 | | | | granulated | 4 | 5 |

Example 7

Preparation of Beverage Containing Thickening Composition (Tea)

To 100 g of tea (trade name: "Oi Ocha", ITO EN, LTD.), 2 g of the thickening composition (test sample 36) prepared in Example 3 and containing calcium lactate was added, and the mixture was stirred with a spatula. The thickening composition was dispersed all over the liquid rapidly, no unmixed lumps were formed, and the expression of viscosity was good. This thickened tea had a good flavor, and was suitable for use as a tea for people with mastication and swallowing disorders.

(Refreshing Beverage)

To 100 g of a refreshing beverage (trade name: "AQUARIUS", Coca-Cola (Japan) Company Limited), 2 g of the granulated product (test sample 56) containing the thickening polysaccharide and the enclosure material at a mixing ratio of 50:50 was added, and the mixture was stirred with a spatula. The granulated product was dispersed all over the liquid rapidly, no unmixed lumps were formed, and the expression of viscosity was good. This thickened refreshing beverage had a good flavor, and was suitable for use as a refreshing beverage for people with mastication and swallowing disorders.

Example 8

Influence of Mass Ratio between Enclosure Material and Thickening Polysaccharide on Flavor of Food Enclosure materials were prepared by the same method as in Example 1. Here, magnesium sulfate was used as the metal salt, the dextrin TK-16 (manufactured by Matsutani Chemical Industry Co., Ltd.) was used, and the resultant ratios of the metal salt in the enclosure materials were as shown in Table 10. Next, these enclosure materials were subjected to powder blending with xanthan gum, serving as a thickening polysaccharide, at the mass ratios shown in Table 10 to prepare thickening compositions in each of which the ratio of the metal salt was 5.2 parts by mass relative to 100 parts by mass of the thickening polysaccharide.

Subsequently each of the thickening compositions in an amount equivalent to 1 g of the thickening polysaccharide was added to 100 g of instant coffee (NESCAFE GOLD BLEND (Nestle Japan Ltd.)) containing 1.5 g of coffee powder. Thus, coffee beverages containing the thickening compositions were obtained. A sensory test (N=5) of the flavor of each of the obtained beverages was conducted by five panelists using the criteria shown in Table 9, and the most frequent value was employed as the score. A beverage with a score of 2 or lower was evaluated to be Poor (no flavor was noticeable), a beverage with a score of 3 was evaluated to be Fair (the flavor was slightly poor), and a beverage with a score of 4 or higher was evaluated to be Good (the flavor was unchanged). Based on the results, it was found that the flavor was reduced with the increase in mass ratio of the enclosure material, and the flavor was reduced or deteriorated when the mass ratio of the thickening polysaccharide to the enclosure material was 40:60 or lower.

TABLE 9

Evaluation criteria of sensory test

| Score | Evaluation criteria | Evaluation |
|---|---|---|
| 5 | The flavor hardly changed in comparison with the case where no thickening composition was added. | Good |
| 4 | The flavor did not greatly change in comparison with the case where no thickening composition was added. | |
| 3 | The flavor was slightly poor in comparison with the case where no thickening composition was added. | Fair |
| 2 | The flavor was noticeable only slightly. | Poor |
| 1 | No flavor was noticeable at all. | |

TABLE 10

Influence of mass ratio between enclosure material and
thickening polysaccharide on flavor of coffee (the ratios in parts by
mass of the metal salt were all 5.2 parts by mass relative to 100 parts
by mass of the thickening polysaccharide)

| Test sample | Ratio of metal salt in enclosure material (% by mass) | Mass ratio between enclosure material and thickening polysaccharide | | Score | Evaluation |
|---|---|---|---|---|---|
| | | Thickening polysaccharide | Enclosure material | | |
| 57 | 2.2 | 30 | 70 | 1 | Poor |
| 58 | 3.5 | 40 | 60 | 3 | Fair |
| 59 | 5.2 | 50 | 50 | 4 | Good |
| 60 | 12.1 | 70 | 30 | 5 | Good |

The invention claimed is:

1. A thickening composition, consisting of:
  a thickening polysaccharide; and a metal salt-enclosing dextrin, wherein
  the metal salt is selected from the group consisting of calcium lactate, calcium acetate, calcium gluconate, calcium pantothenate, calcium ascorbate, magnesium sulfate, trisodium citrate, and tripotassium citrate;
  the thickening polysaccharide is selected from the group consisting of xanthan gum, carrageenan, guar gum, locust bean gum, tara gum, and glucomannan;
  a mass ratio of the thickening polysaccharide to a total metal salt-enclosing dextrin is from 46:54 to 70:30; and
  a ratio in parts by mass of the total metal salt is 3.5 to 12.8 parts by mass relative to 100 parts by mass of the thickening polysaccharide,
  wherein the dextrin has a DE of 8 to 25.

2. The thickening composition according to claim 1, wherein the ratio in parts by mass of the total metal salt is 3.5 to 7.6 parts by mass relative to 100 parts by mass of the thickening polysaccharide.

3. A method for producing the thickening composition according to claim 1, the method comprising the steps of:
  obtaining the metal salt-enclosing dextrin by mixing, dissolving, and homogenizing the dextrin and the metal salt in water, followed by drying; and
  adding the metal salt-enclosing dextrin to the thickening polysaccharide, followed by mixing or granulation.

* * * * *